US010454507B2

(12) United States Patent
Nomachi

(10) Patent No.: US 10,454,507 B2
(45) Date of Patent: Oct. 22, 2019

(54) COMMUNICATION DEVICE

(71) Applicant: SoftBank Corp., Minato-ku, Tokyo (JP)

(72) Inventor: Masanori Nomachi, Minato-ku (JP)

(73) Assignee: SOFTBANK CORP., Tokyo (JP)

( * ) Notice: Subject to any disclaimer, the term of this patent is extended or adjusted under 35 U.S.C. 154(b) by 46 days.

(21) Appl. No.: 15/312,529

(22) PCT Filed: Jul. 29, 2016

(86) PCT No.: PCT/JP2016/072395
§ 371 (c)(1),
(2) Date: Nov. 18, 2016

(87) PCT Pub. No.: WO2017/081891
PCT Pub. Date: May 18, 2017

(65) Prior Publication Data
US 2017/0264321 A1 Sep. 14, 2017

(30) Foreign Application Priority Data
Nov. 11, 2015 (JP) .................. 2015-221551

(51) Int. Cl.
H04B 1/00 (2006.01)
H04B 1/401 (2015.01)
H04W 88/06 (2009.01)
(52) U.S. Cl.
CPC ........... *H04B 1/006* (2013.01); *H04B 1/0067* (2013.01); *H04B 1/401* (2013.01); *H04W 88/06* (2013.01)
(58) Field of Classification Search
CPC .................................................. H04W 88/06
See application file for complete search history.

(56) References Cited

U.S. PATENT DOCUMENTS

| 2006/0116088 A1* | 6/2006 | Block | H04B 1/005 455/121 |
| 2013/0028128 A1* | 1/2013 | Novak | H04L 1/00 370/252 |
| 2014/0329475 A1* | 11/2014 | Ella | H04B 1/006 455/77 |

FOREIGN PATENT DOCUMENTS

| JP | 2005-531951 A | 10/2005 |
| JP | 2012-070267 A | 4/2012 |
| JP | 2014-526847 A | 10/2014 |

OTHER PUBLICATIONS

Office Action from Japan Patent Office, dated Oct. 18, 2016 in the corresponding JP Application No. 2015-221551, (3 pages), with English translation (3 pages).

(Continued)

Primary Examiner — Zhitong Chen
(74) Attorney, Agent, or Firm — Lewis Roca Rothgerber Christie LLP

(57) ABSTRACT

The communication device includes a switching controller. In a case where the communication band to be used is a second frequency band between a second lower edge frequency and a second upper edge frequency or in a case where the communication band to be used is a first frequency band between a first lower edge frequency and a first upper edge frequency and a frequency of the signal to be used is included in a first passband, the switching controller controls a filter switcher to switch to a first filter. In a case where the communication band to be used is a third frequency band between a third lower edge frequency and a third upper edge frequency or in a case where the communication band to be used is a first frequency band and the frequency of the signal to be used is included in a second passband, the switching controller controls the filter switcher to switch to a second filter. The third lower edge (Continued)

frequency is higher than the second lower edge frequency, and the third upper edge frequency is higher than the second upper edge frequency.

3 Claims, 6 Drawing Sheets

(56) References Cited

OTHER PUBLICATIONS

International Search Report and Written Opinion in connection with the corresponding PCT Application No. PCT/JP2016-072395 in Japanese, dated Oct. 18, 2016, (7 pagess).

* cited by examiner

COMMUNICATION DEVICE

CROSS-REFERENCE TO RELATED APPLICATION(S)

This application is a National Phase Patent Application and claims the priority of International Application Number PCT/JP2016/072395, filed on Jul. 29, 2016, which claims priority of Japanese Patent Application Number 2015-221551, filed Nov. 11, 2015, the entire contents of which are incorporated herein by reference.

TECHNICAL FIELD

Embodiments discussed in the present specification relate to a communication device equipped in a mobile phone.

BACKGROUND

In recent years, international standards of mobile communication systems for Third Generation (3G) and later generations have been developed by a standardization project called 3GPP (Third Generation Partnership Project). For example, frequency bands of LTE (Long Term Evolution) which is a communication standard for mobile phones are defined by a technical specification "TS 36.101" of 3GPP. In the technical specification "TS 36.101", an uplink (UL) frequency band and a downlink (DL) frequency band are defined as frequency bands for each band of LTE with band names (LTE band) such as "Band 1", "Band 2", . . . . For example, in the technical specification "TS 36.101", 2500 MHz to 2570 MHz and 2620 MHz to 2690 MHz are defined for the uplink frequency band and the downlink frequency band, respectively, of Band 7.

A mobile phone supporting LTE includes a communication module supporting any one of the bands of the multiple LTE bands. For example, Patent literature 1 describes a communication module supporting a single band and a communication module supporting two bands.

CITATIONS LIST

Patent Literature

Patent literature 1: Japanese Unexamined Patent Publication (Kokai) No. 2012-70267

SUMMARY

Technical Problem

In the communication module supporting two bands described in Patent literature 1, constituent components for transmitting and receiving signals of the corresponding bands are provided, and as a result, the communication module needs to be of a certain size. However, as the sizes of mobile phones have reduced in recent years, a small-sized communication module supporting signals of multiple bands are required.

The communication device is made to solve the above conventional problems, and it is an object to reduce the device size of a communication device capable of covering multiple frequency bands.

Solution to Problem

According to an aspect of the communication device, there is provided a communication device for communicating in any of frequency bands including a first frequency band between a first lower edge frequency and a first upper edge frequency, a second frequency band between a second lower edge frequency and a second upper edge frequency, and a third frequency band between a third lower edge frequency and a third upper edge frequency. The communication device includes, a determining controller for determining a communication band to be used and a frequency of a signal to be used, a first filter for allowing a signal in a first passband between the first lower edge frequency and the second upper edge frequency to pass through, a second filter for allowing a signal in a second passband between the third lower edge frequency and the first upper edge frequency to pass through, a filter switcher for switching to any one of the first filter and the second filter, and a switching controller for controlling the filter switcher to switch to the first filter, in a case where the communication band to be used is the second frequency band or in a case where the communication band to be used is the first frequency band and a frequency of the signal to be used is included in the first passband, and controlling the filter switcher to switch to the second filter, in a case where the communication band to be used is the third frequency band or in a case where the communication band to be used is the first frequency band and the frequency of the signal to be used is included in the second passband; wherein the second lower edge frequency, the second upper edge frequency, the third lower edge frequency, and the third upper edge frequency are included in the first frequency band, and the third lower edge frequency is higher than the second lower edge frequency, and the third upper edge frequency is higher than the second upper edge frequency.

According to an aspect of the communication device, there is provided a communication device for communicating in any of frequency bands including a first frequency band between a first lower edge frequency and a first upper edge frequency used as an uplink frequency band and a downlink frequency band, a second frequency band between a second lower edge frequency and a second upper edge frequency used as an uplink frequency band and a downlink frequency band, and a fifth frequency band including a third frequency band between a third lower edge frequency and a third upper edge frequency used as a downlink frequency band and a fourth frequency band between a fourth lower edge frequency and a fourth upper edge frequency used as an uplink frequency band. The communication device includes, a determining controller for determining a communication band to be used and a frequency of a signal to be used, a first filter for allowing a signal in a first passband between the second lower edge frequency and the second upper edge frequency to pass through, a third filter including a filter for passing a signal in a second passband between the third lower edge frequency and the first upper edge frequency to pass through and a filter for passing a signal in a third passband between the first lower edge frequency and the fourth upper edge frequency to pass through, a filter switcher for switching to any one of the first filter and the third filter, and a switching controller for controlling the filter switcher to switch to the first filter, when the communication band to be used is the second frequency band or the communication band to be used is the first frequency band and a frequency of the signal to be used is included in the first passband, and for controlling the filter switcher to switch to the third filter, when the communication band to be used is the third frequency band or the fourth frequency band or the communication band to be used is the first frequency band and the frequency of the signal to be used is included in the second passband or the third passband, wherein the second lower edge frequency, the second upper edge frequency, the third lower edge frequency, the third upper edge frequency, the fourth lower edge frequency, and the fourth upper edge frequency are included in the first frequency band, and the third lower edge frequency is higher than the second lower edge frequency, the third upper edge frequency is higher than the second upper edge frequency, the second lower edge frequency is higher than the fourth lower edge frequency, and the second upper edge frequency is higher than the fourth upper edge frequency.

According to an aspect of the communication device, the first frequency band is a frequency band of LTE Band 41 defined by 3GPP, the second frequency band is an uplink frequency band and a downlink frequency band of LTE Band 38 defined by 3GPP, and the fifth frequency band is a frequency band of LTE Band 7 defined by 3GPP.

Advantageous Effects of Invention

The communication device can support signals in three or more bands while the substrate size is not increased.

DESCRIPTION OF EMBODIMENTS

Hereinafter, various embodiments of the present invention will be explained with reference to drawings. However, the technical scope of the present invention is not limited to the embodiments thereof, and it is to be understood that the present invention covers the invention disclosed in the claims and the equivalents thereof.

First Embodiment

Figure 1:
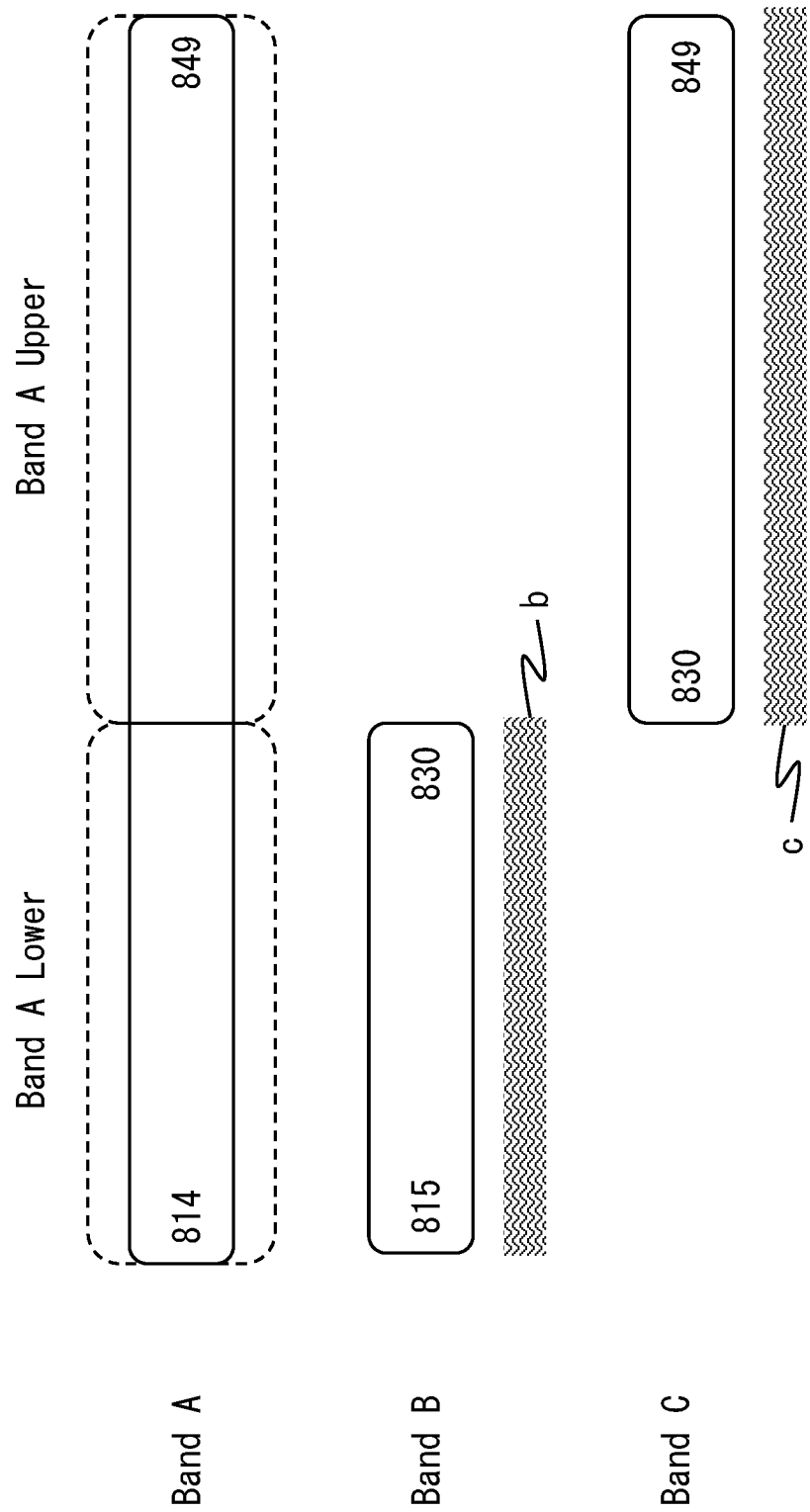
FIG. 1 is a schematic diagram for explaining an overview of an example of three frequency bands in which a communication device 2 performs communication.

FIG. 1 is a schematic diagram for explaining an overview of an example of three frequency bands in which a communication device 2 performs communication. It should be noted that the communication device 2 is, for example, a communication module equipped in a mobile phone 1. The mobile phone 1 is, for example, a multi-functional mobile phone called a "smartphone" or a mobile phone called a feature phone. A device equipped with the communication device 2 is not limited not the mobile phone 1, and may be a device dedicated to data communication. The device dedicated to data communication may be a portable device or a fixed device.

The communication device 2 supports signals in frequency bands of Band A, Band B, and Band C. The duplex mode for Band A, Band B, and Band C is a TDD (Time Division Duplex) mode. The TDD uses the same frequency band with a single carrier wave, and is a method for performing communication by switching transmission processing and reception processing at a high speed by dividing the frequency band into many slots in the time axis. More specifically, in the TDD mode, the uplink frequency band and the downlink frequency band are the same frequency band.

The frequency band of Band A is 814 MHz to 849 MHz. It should be noted that the frequency band of Band A is an example of a first frequency band. A frequency 814 MHz, i.e., a lower edge frequency of the frequency band of Band A is an example of a first lower edge frequency. A frequency 849 MHz, i.e., an upper edge frequency of the frequency band of Band A is an example of a first upper edge frequency.

The frequency band of Band B is 815 MHz to 830 MHz. It should be noted that the frequency band of Band B is an example of a second frequency band. A frequency 815 MHz, i.e., a lower edge frequency of the frequency band of Band B is an example of a second lower edge frequency. A frequency 830 MHz, i.e., an upper edge frequency of the frequency band of Band B is an example of a second upper edge frequency. It should be noted that the second frequency band may be any frequency band included in the first frequency band as long as the second lower edge frequency is equal to or higher than the first lower edge frequency, and the second upper edge frequency is lower than the first upper edge frequency.

The frequency band of Band C is 830 MHz to 849 MHz. It should be noted that the frequency band of Band C is an example of a third frequency band. A frequency 830 MHz, i.e., a lower edge frequency of the frequency band of Band C is an example of a third lower edge frequency. A frequency 849 MHz, i.e., an upper edge frequency of the frequency band of Band C is an example of a third upper edge frequency. It should be noted that the third frequency band may be any frequency band included in the first frequency band as long as the third lower edge frequency is higher than the second lower edge frequency, and the third upper edge frequency is higher than the second upper edge frequency and equal to or lower than the first upper edge frequency.

The communication device 2 includes a first filter 22 for allowing the frequency band of Band B (815 MHz to 830 MHz) to pass through and a second filter 23 for allowing the frequency band of Band C (830 MHz to 849 MHz) to pass through. The first filter 22 and the second filter 23 are filters for the TDD mode, and is, for example, a band-pass filter (BPF) constituted by a resonant circuit and the like.

The passband b of the first filter 22 includes not only the frequency band of Band B (815 MHz to 830 MHz) but also the frequency 814 MHz, i.e., the lower edge frequency of the frequency band of Band A. More specifically, the passband b includes at least a frequency band between the frequency 814 MHz, i.e., the lower edge frequency of the frequency band of Band A and the frequency 830 MHz, i.e., the lower edge frequency of the frequency band of Band B. The passband b is an example of a first passband.

The passband c of the second filter 23 includes not only the frequency band of Band C (830 MHz to 849 MHz) but also the frequency 849 MHz, i.e., the upper edge frequency of the frequency band of Band A. More specifically, the passband c includes at least a frequency band between the frequency 830 MHz, i.e., the lower edge frequency of the frequency band of Band C and the frequency 849 MHz, i.e., the upper edge frequency of the frequency band of Band A. The passband c is an example of a second passband.

The upper edge frequency of the passband b is equal to or higher than the lower edge frequency of the passband c. More specifically, the frequency band of Band A (814 MHz to 849 MHz) is included by the passband b and the passband c. Therefore, the frequency band of Band A can be covered by the passband b of the first filter 22 and the passband c of the second filter 23. Hereinafter, in the frequency band of Band A, the band corresponding to the passband b may be referred to as a band A lower side band (Band A Lower), and the band corresponding to the passband c may be referred to as a band A upper side band (Band A Upper).

As described above, the communication device 2 includes the first filter 22 and the second filter 23, and therefore, the communication device 2 is not required to be further provided with a filter for a passband including the frequency band of Band A. Therefore, the number of components constituting the communication device 2 can be reduced.

Figure 2:
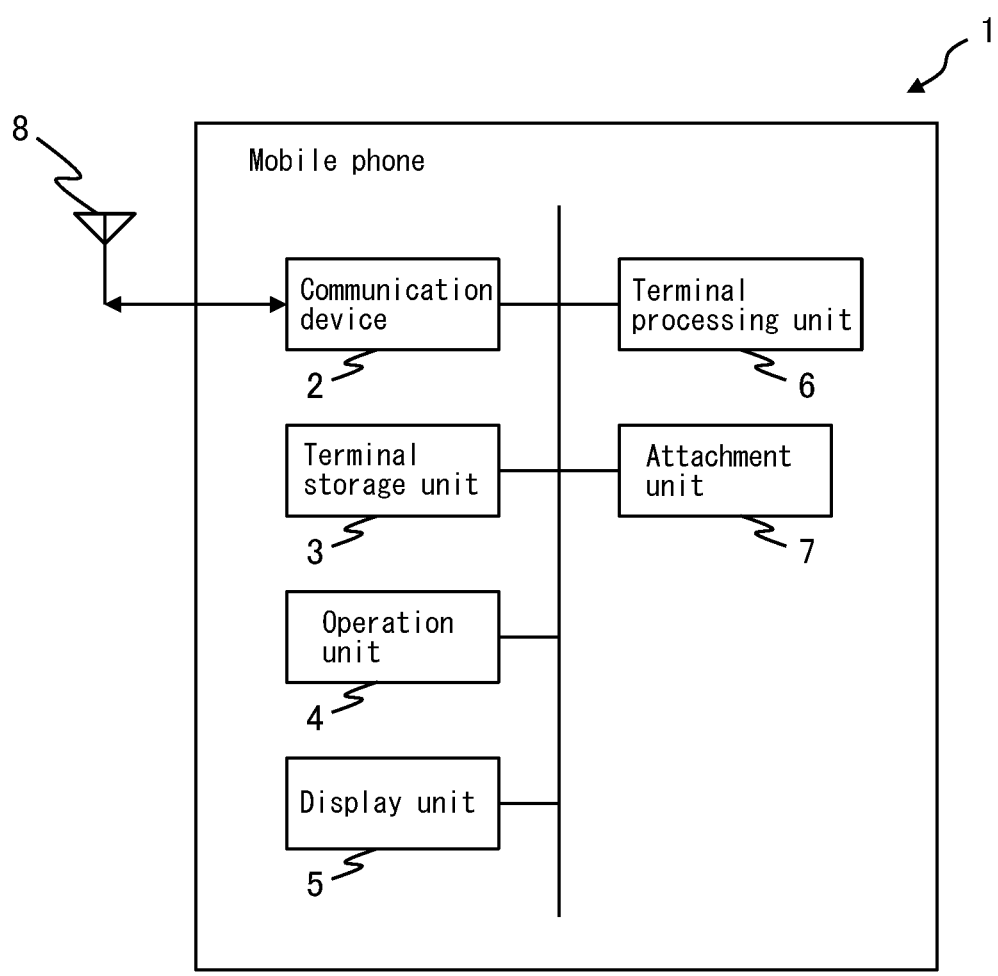
FIG. 2 is a figure illustrating an example of a schematic configuration of a mobile phone 1 equipped with the communication device 2.

FIG. 2 is a figure illustrating an example of a schematic configuration of the mobile phone 1 equipped with the communication device 2.

The mobile phone 1 includes a communication device 2, a terminal storage unit 3, an operation unit 4, a display unit 5, a terminal processing unit 6, and an attachment unit 7. The mobile phone 1 is capable of, e.g., making a voice call to another mobile phone 1 and transmitting and receiving information via the Internet in response to an operation performed by a player with the operation unit 4 (a touch panel, a button, and the like).

The communication device 2 is connected to an antenna unit 8 of which sensitive bands are the frequency bands of Band A, Band B, and Band C. The communication device 2 connects the mobile phone 1 to a wireless communication network. The communication device 2 communicates with a base station (not shown) by establishing a wireless signal line with the base station by an LTE method and the like via a channel allocated by the base station. Then, the communication device 2 transmits data provided from the terminal processing unit 6 on a web server apparatus (not shown) and the like. The communication apparatus 2 provides data received from the web server apparatus and the like to the terminal processing unit 6.

The terminal storage unit 3 includes, for example, a semiconductor memory apparatus. The terminal storage unit 3 stores an operating system program, driver programs, application programs, data, and the like used for the processing with the terminal processing unit 6. For example, the terminal storage unit 3 stores, as driver programs, an input device driver program for controlling the operation unit 4, an output device driver program for controlling the display unit 5, and the like. The terminal storage unit 3 stores, as application programs, such as a program for obtaining and displaying display data from a web server apparatus and the like. The computer program may be installed on the terminal storage unit 3 by using a p publicly-known setup program and the like from computer-readable removable recording media such as, for example, a CD-ROM (compact disk read only memory), a DVD-ROM (digital versatile disk read only memory), and the like. The computer program may be installed from a particular server apparatus and the like to the terminal storage unit 3 via the wireless communication. The terminal storage unit 3 stores information about the communication bands used by the mobile phone 1. The terminal storage unit 3 stores, as data, identification information about the user of the mobile phone 1, transmitted and received mail data, address book data, image data, and the like. Further, the terminal storage unit 3 may temporarily store temporary data for predetermined processing.

The operation unit 4 may be any device as long as the mobile phone 1 can be operated, and the operation unit 4 is, for example, a touch panel, a key button, and the like. The player can input characters, numerals, symbols, and the like by using the operation unit 4. When the operation unit 4 is operated by the player, the operation unit 4 generates a signal corresponding to the operation. Then, the generated signal is provided to the terminal processing unit 6 as a command of the player.

The display unit 5 may be any device as long as the display unit 5 can display videos, images, and the like, and the display unit 5 is, for example, a liquid crystal display, an organic EL (Electro-Luminescence) display, and the like. The display unit 5 displays videos according to video data, images according to image data, and the like provided from the terminal processing unit 6.

The terminal processing unit 6 includes one or more processors and peripheral circuits therefor. The terminal processing unit 6 is, for example, a CPU (Central Processing Unit), and centrally controls overall operation of the mobile phone 1. The terminal processing unit 6 controls operations of the communication device 2, the display unit 5, and the like on the basis of an operation and the like performed with the operation unit 4 and a program stored in the terminal storage unit 3 so that various kinds of processing of the mobile phone 1 are executed in an appropriate procedure. The terminal processing unit 6 executes processing on the basis of programs stored in the terminal storage unit 3 (an operating system program, a driver program, an application program, and the like). The terminal processing unit 6 can execute multiple programs (application programs and the like) in parallel.

The attachment unit 7 includes a card slot detachably holding a storage medium (not shown). For example, in a case where the storage medium is a SIM card, the attachment unit 7 includes a SIM slot, and has a function of reading cell phone carrier information and the like stored in the SIM card.

Figure 3:
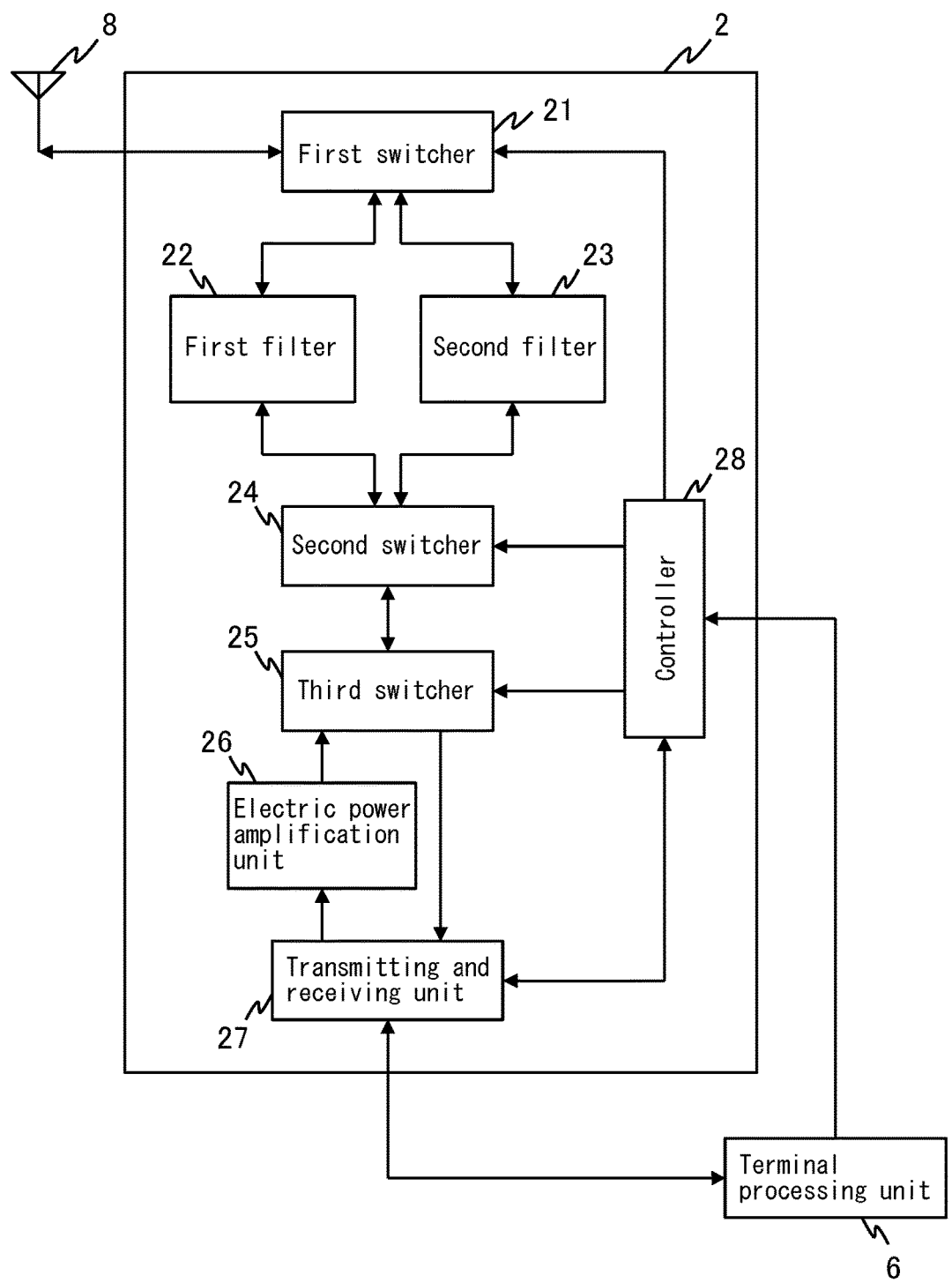
FIG. 3 is a figure illustrating an example of a schematic configuration of the communication device 2.

FIG. 3 is a figure illustrating an example of a schematic configuration of the communication device 2.

The communication device 2 processes communication of signals in frequency bands corresponding to three bands, i.e., Band A, Band B, and Band C. The communication device 2 is connected to the antenna unit 8. The antenna unit 8 transmits a signal received from the communication device 2 to a base station and the like, and gives a signal received from a base station and the like to the communication device 2.

The communication device 2 includes a first switcher 21, a first filter 22, a second filter 23, a second switcher 24, a third switcher 25, an electric power amplification unit 26, a transmitting and receiving unit 27, a controller 28, and the like.

The first switcher 21 is constituted by a radio frequency switch (RF switch, SW) for switching between a transmission path between the antenna unit 8 and the first filter 22 and a transmission path between the antenna unit 8 and the second filter 23. In accordance with the switch switching control performed by the controller 28 explained later, the first switcher 21 is switched.

The first filter 22 and the second filter 23 are filters for the TDD mode, and are, for example, band-pass filters (BPF). The first filter 22 allows a signal in a passband b (see FIG. 1) to pass through and the second filter 23 allows a signal in a passband c (see FIG. 1) to pass through.

The second switcher 24 is constituted by a radio frequency switch for switching between a transmission path between the first filter 22 and the third switcher 25 and a transmission path between the second filter 23 and the third switcher 25. In accordance with the switch switching control performed by the controller 28 explained later, the second switcher 24 is switched. It should be noted that the first switcher 21 and the second switcher 24 are examples of a filter switcher.

The third switcher 25 is constituted by a radio frequency switch for alternately switching a transmission signal and a reception signal. More specifically, a transmission path of a transmission signal from the electric power amplification unit 26 to the second switcher 24 and a transmission path of a reception signal from the second switcher 24 to the transmitting and receiving unit 27 are alternately switched in accordance with switching of the third switcher 25.

The electric power amplification unit 26 is, for example, an electric power amplification device. The electric power amplification device is constituted by an MMIC (Microwave Monolithic IC), and the like, and includes a function for amplifying a transmission signal received from the transmitting and receiving unit 27.

The transmitting and receiving unit 27 is constituted by a radio frequency IC (Integrated Circuit) and the like, and performs processing such as modulation and demodulation conversion of signals. The transmitting and receiving unit 27 generates a transmission signal obtained by modulating a signal received from the terminal processing unit 6, and gives the transmission signal to the electric power amplification unit 26. The transmitting and receiving unit 27 gives a signal obtained by demodulating the reception signal to the terminal processing unit 6.

The controller 28 is constituted by an LSI (Large-Scale Integration) and the like, and executes processing for determining a communication band to be used and a frequency of a signal to be used, and controls the first switcher 21, the second switcher 24, and the third switcher 25. The controller 28 executing processing for determining the communication band to be used and the frequency of a signal to be used is an example of a determination module. The controller 28 controlling the first switcher 21, the second switcher 24, and the third switcher 25 is an example of a switching controller.

When a portable terminal equipped with the communication device 2 is activated, or when a base station to be communicated with is changed due to a handover that occurred in accordance with movement and the like of the portable terminal, the controller 28 determines the communication band to be used. For example, the terminal processing unit 6 obtains information about the communication band used by the mobile phone 1 stored in the terminal storage unit 3, and the controller 28 obtains the information about the communication band from the terminal processing unit 6, and determines the communication band to be used. Then, the controller 28 determines the frequency of the signal to be used on the basis of the frequency channel information allocated by the base station. It should be noted that the controller 28 may determine the communication band simultaneously with searching the receivable frequency channel. The controller 28 performs switch switching control explained later, and carries out, in order, processing for causing the signal to pass through the first filter 22 and receiving the signal and processing for causing the signal to pass through the second filter 23 and receiving the signal. The controller 28 refers to the frequency band information and the like included in the received signal, and determines the used communication band. Then, the controller 28 determines the frequency of the signal to be used on the basis of the frequency channel information allocated by the base station.

The controller 28 performs switch switching control explained below before starting communication so that a communication of a signal can be performed in a frequency band of a communication band determined.

First, a switch switching control will be explained in a case where a reception signal and a transmission signal in Band B and a reception signal and a transmission signal in Band A lower side band are communicated.

The controller 28 performs switch switching control in accordance with the frequency band that has been determined to be used. More specifically, the controller 28 performs switching control of the first switcher 21 and the second switcher 24 so as to switch to one of the first filter 22 and the second filter 23, whichever is supporting the determined frequency band.

The controller 28 performs switching control of the first switcher 21 and the second switcher 24 so that the reception signal and the transmission signal in Band B and the reception signal and the transmission signal in Band A lower side band pass through the first filter 22 having the passband b. More specifically, the first switcher 21 is switched so that the reception signal and the transmission signal pass through the transmission path between the antenna unit 8 and the first filter 22. Further, the second switcher 24 is switched so that the reception signal and the transmission signal pass through the transmission path between the third switcher 25 and the first filter 22.

As a result, the reception signal received by the antenna unit 8 passes through the first switcher 21, the first filter 22, the second switcher 24, the third switcher 25, and the transmitting and receiving unit 27.

The transmission signal passes the transmitting and receiving unit 27, the electric power amplification unit 26, the third switcher 25, the second switcher 24, the first filter 22, and the first switcher 21, and is transmitted by the antenna unit 8 to a base station and the like.

Subsequently, a switch switching control will be explained in a case where a reception signal and a transmission signal in Band C and a reception signal and a transmission signal in Band A upper side band are communicated.

The controller 28 performs switching control of the first switcher 21 and the second switcher 24 so that the reception signal and the transmission signal in Band C and the reception signal and the transmission signal in Band A upper side band pass through the second filter 23 having the passband c. More specifically, the first switcher 21 is switched so that the reception signal and the transmission signal passes through the transmission path between the antenna unit 8 and the second filter 23. Further, the second switcher 24 is switched so that the reception signal and the transmission signal passes through the transmission path between the third switcher 25 and the second filter 23.

As a result, the reception signal received by the antenna unit 8 passes through the first switcher 21, the second filter 23, the second switcher 24, the third switcher 25, and the transmitting and receiving unit 27.

The transmission signal passes through the transmitting and receiving unit 27, the electric power amplification unit 26, the third switcher 25, the second switcher 24, the second filter 23, and the first switcher 21, and is transmitted by the antenna unit 8 to a base station and the like.

As explained above, in the communication device 2, the frequency band of Band A is covered by the passband b of the first filter 22 for Band B and the passband c of the second filter 23 for Band C, and therefore, the communication device 2 is not required to be further provided with a filter with a passband including the frequency band of Band A. Therefore, the number of components constituting the communication device 2 can be reduced.

In the above embodiment, for example, three bands is used as an example of frequency bands supported by the communication device 2, but the number of frequency bands supported by the communication device 2 is not limited to three. For example, in a case where the communication device 2 supports four types of bands, the frequency band of any one of the four types of bands includes other frequency bands in three bands. In this case, a frequency band of a single band is covered by three types of filters that respectively allow the other three bands to pass through. As described above, in three or more bands supported by the communication device 2, a frequency band of a single band of three or more bands includes the frequencies of the other bands, and the frequency band of the single band is covered by three types of filters that respectively allow the other bands to pass through, and therefore, the number of components constituting the communication device 2 can be reduced.

Second Embodiment

Figure 4:
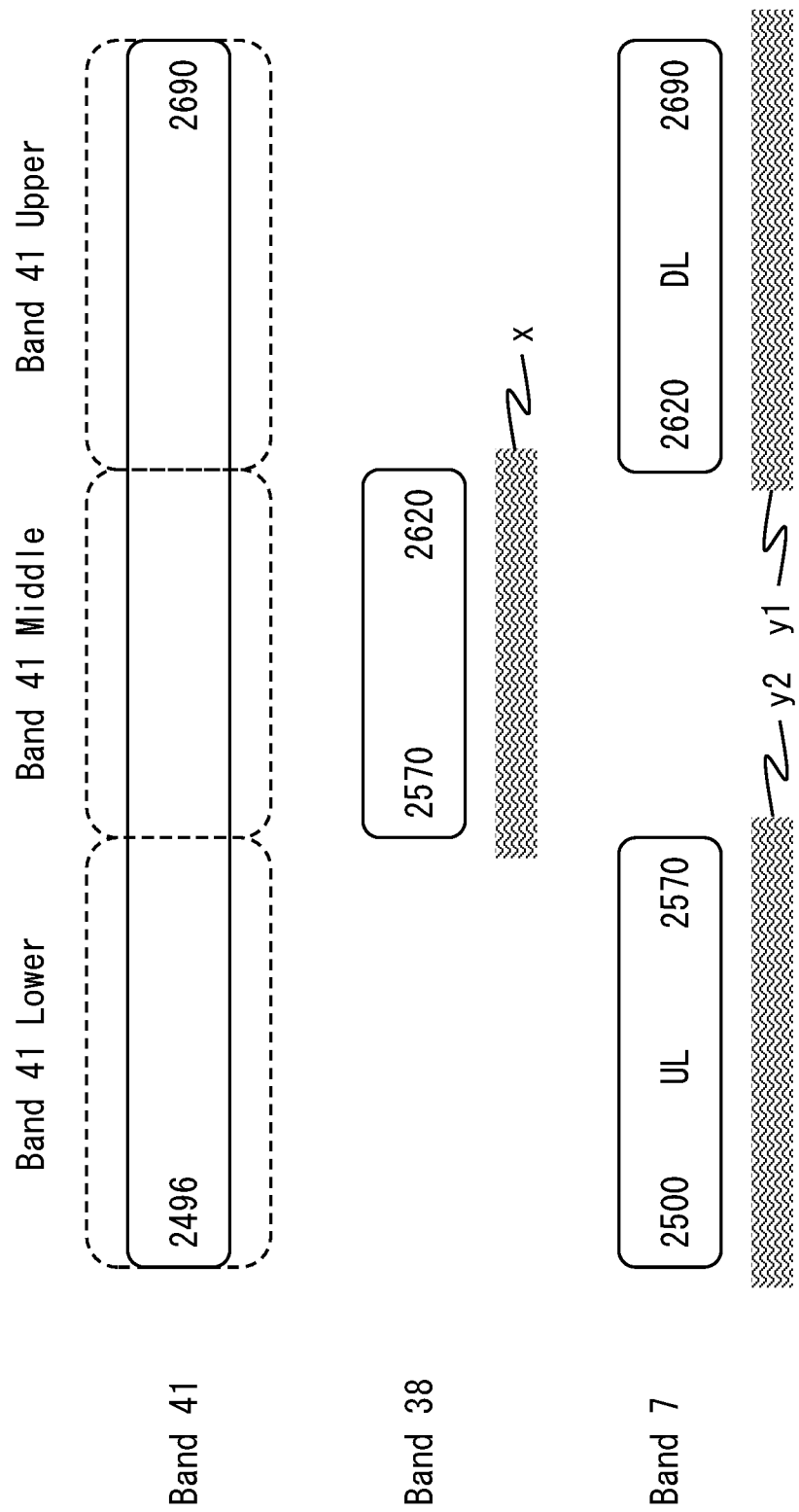
FIG. 4 is a schematic diagram for explaining an overview of an example of three frequency bands in which a communication device 20 performs communication.

FIG. 4 is a schematic diagram for explaining an overview of an example of frequency bands of three bands in which the communication device 20 performs communication. It should be noted that the communication device 20 is a communication module and the like equipped in the mobile phone 1 and the like.

The communication device 20 supports signals in frequency bands of Band 41, Band 38, and Band 7. Each of Band 41, Band 38, and Band 7 is an LTE band defined by the technical specification "TS 36.101" of 3GPP. The duplex mode of Band 41 and Band 38 is a TDD mode. On the other hand, the duplex mode of Band 7 is an FDD (Frequency Division Duplex) mode. FDD is a method for performing full duplex communication in which a frequency band used for communication is divided into two frequency bands, i.e., a frequency band for transmission and a frequency band for reception. More specifically, the uplink frequency band and the downlink frequency band in the FDD mode are different frequency bands.

The frequency band in Band 41 is 2496 MHz to 2690 MHz. It should be noted that the frequency band of Band 41 is an example of a first frequency band. A frequency 2496 MHz, i.e., a lower edge frequency of the frequency band of Band 41 is an example of a first lower edge frequency. A frequency 2690 MHz, i.e., an upper edge frequency of the frequency band of Band 41 is an example of a first upper edge frequency.

The frequency band of Band 38 is 2570 MHz to 2620 MHz. It should be noted that the frequency band of Band 38 is an example of a second frequency band. A frequency 2570 MHz, i.e., a lower edge frequency of the frequency band of Band 38 is an example of a second lower edge frequency. A frequency 2620 MHz, i.e., an upper edge frequency of the frequency band of Band B is an example of a second upper edge frequency. It should be noted that the second frequency band may be any frequency band included in the first frequency band as long as the second lower edge frequency is higher than the first lower edge frequency, and the second upper edge frequency is lower than the first upper edge frequency.

The uplink frequency band and the downlink frequency band of Band 7 are 2500 MHz to 2570 MHz and 2620 MHz to 2690 MHz.

It should be noted that the downlink frequency band of Band 7 is an example of a third frequency band. A frequency 2620 MHz, i.e., a lower edge frequency of the downlink frequency band of Band 7 is an example of a third lower edge frequency. A frequency 2690 MHz, i.e., an upper edge frequency of the downlink frequency band of Band 7 is an example of a third upper edge frequency. The uplink frequency band of Band 7 is an example of a fourth frequency band. A frequency 2500 MHz, i.e., a lower edge frequency of the uplink frequency band of Band 7 is an example of a fourth lower edge frequency. A frequency 2570 MHz, i.e., an upper edge frequency of the uplink frequency band of Band 7 is an example of a fourth upper edge frequency. It should be noted that a frequency band including both of the third frequency band and the fourth frequency band is an example of a fifth frequency band.

It should be noted that the third frequency band may be any frequency band included in the first frequency band as long as the third lower edge frequency is higher than the second lower edge frequency, and the third upper edge frequency is higher than the second upper edge frequency and equal to or lower than the first upper edge frequency. It should be noted that the fourth frequency band may be any frequency band included in the first frequency band as long as the fourth lower edge frequency is higher than the second lower edge frequency and equal to or higher than the first lower edge frequency, and the fourth upper edge frequency is lower than the second upper edge frequency.

The communication device 20 includes a first filter 22 for allowing the frequency band (2570 MHz to 2620 MHz) of Band 38 to pass through and a third filter 203 for allowing the uplink frequency band (2500 MHz to 2570 MHz) and the downlink frequency band (2620 MHz to 2690 MHz) of Band 7 to pass through. The first filter 22 of Band 38 is a filter for the TDD mode, and is, for example, a band-pass filter (BPF). The third filter for Band 7 is an antenna sharing device for the FDD mode, and is, for example, a duplexer (DUP). The duplexer includes a filter A terminal 2031 functioning as a filter having the uplink frequency band (fourth frequency band) as a passband and having the downlink frequency band (third frequency band) as a stopband, a filter B terminal 2032 functioning as a filter having the downlink frequency band (third frequency band) as a passband and having the uplink frequency band as a stopband (fourth frequency band), and an antenna terminal.

The passband x of the first filter 22 includes a frequency band (2570 MHz to 2620 MHz) of Band 38. More specifically, the passband x includes at least a frequency band between a frequency 2570 MHz, i.e., a lower edge frequency of the frequency band of Band 38 and a frequency 2620 MHz, i.e., an upper edge frequency of the frequency band of Band 38.

The passband y1 of the third filter 203 includes not only the downlink frequency band (2620 MHz to 2690 MHz) of Band 7 but also the frequency 2690 MHz, i.e., the upper edge frequency of the frequency band of Band 41. More specifically, the passband y1 includes at least a frequency band between the frequency 2620 MHz, i.e., the lower edge frequency of the downlink frequency band of Band 7 and the frequency 2690 MHz, i.e., the upper edge frequency of the frequency band of Band 41. The passband y1 is an example of a second passband.

The passband y2 of the third filter 203 includes not only the uplink frequency band (2500 MHz to 2570 MHz) of Band 7 but also the frequency 2496 MHz, i.e., the lower edge frequency of the frequency band of Band 41. More specifically, the passband y2 includes at least a frequency band between the frequency 2496 MHz, i.e., the lower edge frequency of the frequency band of Band 41 and the frequency 2570 MHz, i.e., the upper edge frequency of the uplink frequency band of Band 7. The passband y2 is an example of a third passband.

The upper edge frequency of the passband x is equal to or higher than the lower edge frequency of the passband y1, and the lower edge frequency of the passband x is equal to or lower than the upper edge frequency of the passband y2. More specifically, the frequency band (2496 MHz to 26909 MHz) of Band 41 is included in the passband x and the passbands y1 and y2. Accordingly, the frequency band of Band 41 can be covered by the passband x of the first filter 22 and the passbands y1 and y2 of the third filter 203. Hereinafter, of the frequency band of Band 41, a band corresponding to the passband x may be referred to as Band 41 middle band (Band A Middle), a band corresponding to the passband y1 may be referred to as Band 41 upper side band (Band A Upper), and a band corresponding to the passband y2 may be referred to as Band 41 lower side band (Band A Lower).

As described above, the communication device 20 includes the first filter 22 and the third filter 203, and therefore, the communication device 20 is not required to be further provided with a filter with a passband including the frequency band of Band 41. Therefore, the number of components constituting the communication device 20 can be reduced.

Figure 5:
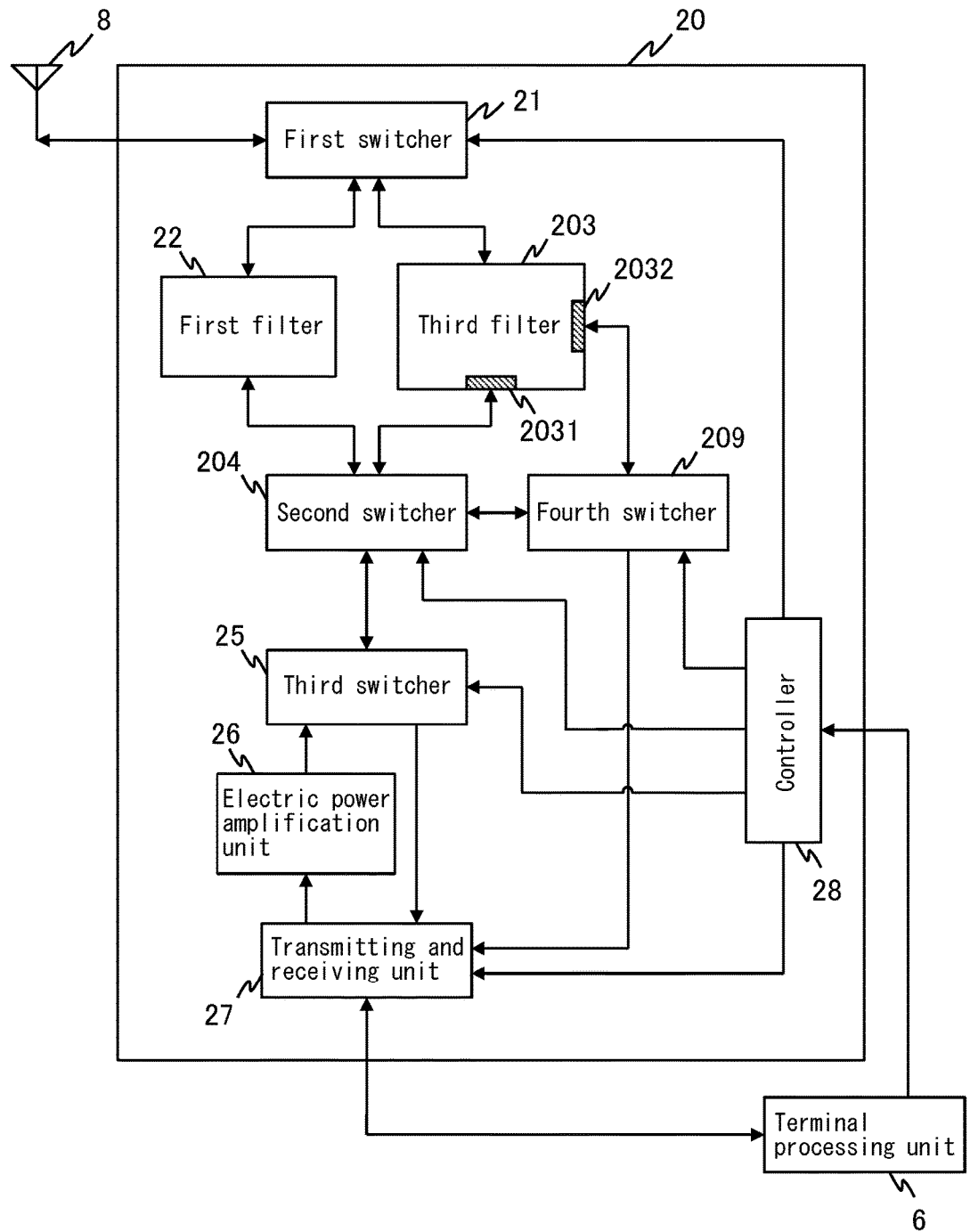
FIG. 5 is a figure illustrating an example of a schematic configuration of the communication device 20.

FIG. 5 is a figure illustrating an example of a schematic configuration of the communication device 20. In FIG. 5, the same constituent elements as those of the communication device 2 as illustrated in FIG. 3 will be denoted with the same reference numerals, and explanation thereabout is omitted.

The communication device 20 processes communication of signals in frequency bands corresponding to three bands, i.e., Band 41, Band 38, and Band 7. The communication device 20 is connected to an antenna unit 8. The antenna unit 8 transmits a signal received from the communication device 20 to a base station and the like, and gives a signal received from a base station and the like to the communication device 20.

The communication device 20 includes a first switcher 21, a first filter 22, a third filter 203, a second switcher 204, a third switcher 25, an electric power amplification unit 26, a transmitting and receiving unit 27, a controller 28, a fourth switcher 209, and the like.

The third filter 203 is an antenna sharing device for the FDD mode, and is, for example, a duplexer (DUP). The third filter 203 allows signals in passbands y1 and y2 (see FIG. 4) to pass through. The filter A terminal 2031 of the third filter 203 is connected to the second switcher 204, and the filter B terminal 2032 of the third filter 203 is connected to the fourth switcher 209. An antenna terminal (not shown) of the third filter 203 is connected to the first switcher 21. Therefore, when the reception signal received by the antenna terminal passes through the third filter 203, the reception signal is transmitted to the fourth switcher 209. When a transmission signal received by the filter A terminal 2031 passes through the third filter 203, the transmission signal is transmitted to the first switcher 21.

The second switcher 204 is constituted by a radio frequency switch (SW) for switching between a transmission path between the third switcher 25 and the first filter 22, a transmission path between the third switcher 25 and the third filter 203, and a transmission path between the third switcher 25 and the fourth switcher 209. In accordance with the switch switching control performed by the controller 28 explained later, the second switcher 204 is switched.

The first filter 22 is a filter for the TDD mode, and is, for example, a band-pass filter (BPF). The first filter 22 allows a signal in a passband x (see FIG. 4) to pass through.

The fourth switcher 209 is constituted by a radio frequency switch for switching between a transmission path between the third filter 203 and the second switcher 204 and a transmission path between the third filter 203 and the transmitting and receiving unit 27. In accordance with the switch switching control explained later, the fourth switcher 209 is switched. It should be noted that the first switcher 21, the second switcher 204, and the fourth switcher 209 are examples of a filter switcher.

First, a switch switching control will be explained in a case where a reception signal and a transmission signal in Band 38 and a reception signal and a transmission signal in Band 41 middle band are communicated.

The controller 28 performs switch switching control in accordance with the frequency band that has been determined to be used. More specifically, the controller 28 performs switching control of the first switcher 21, the second switcher 204, and the fourth switcher 209 so as to switch to one of the first filter 22 and the third filter 203 whichever is supporting the determined frequency band.

The controller 28 performs switching control of the first switcher 21 and the second switcher 204 so that the reception signal and the transmission signal in Band 38 and the reception signal and the transmission signal in Band 41 middle band pass through the first filter 22 having the passband x. More specifically, the first switcher 21 is switched so that the reception signal and the transmission signal pass through the transmission path between the antenna unit 8 and the first filter 22. The second switcher 204 is switched so that the reception signal and the transmission signal pass through the transmission path between the third switcher 25 and the first filter 22.

As a result, the reception signal received by the antenna unit 8 passes through the first switcher 21, the first filter 22, the second switcher 204, the third switcher 25, and the transmitting and receiving unit 27.

The transmission signal passes through the transmitting and receiving unit 27, the electric power amplification unit 26, the third switcher 25, the second switcher 204, the first filter 22, and the first switcher 21, and is transmitted by the antenna unit 8 to a base station and the like.

Subsequently, a switch switching control will be explained in a case where a transmission signal in Band 7 and a reception signal and a transmission signal in Band 41 lower side band are communicated.

The controller 28 performs switching control of the first switcher 21 and the second switcher 204 so that the transmission signal in Band 7 and the reception signal and the transmission signal in Band 41 lower side band pass through the third filter 203 having the passband y2. More specifically, the first switcher 21 is switched so that the reception signal and the transmission signal pass through the transmission path between the antenna unit 8 and the third filter 203. Further, the second switcher 204 is switched so that the reception signal and the transmission signal pass through the transmission path between the third switcher 25 and the third filter 203.

As a result, the reception signal in Band 41 received by the antenna unit 8 passes through the first switcher 21, the third filter 203, the second switcher 204, the third switcher 25, and the transmitting and receiving unit 27.

The transmission signals in Band 7 and Band 41 pass through the transmitting and receiving unit 27, the electric power amplification unit 26, the third switcher 25, the second switcher 204, the third filter 203, and the first switcher 21, and is transmitted by the antenna unit 8 to a base station and the like.

Subsequently, a switch switching control will be explained in a case where a reception signal in Band 7 is communicated.

The controller 28 performs switching control of the first switcher 21 and the fourth switcher 209 so that the reception signal in Band 7 passes through the third filter 203 having the passband y1. More specifically, the first switcher 21 is switched so that the reception signal passes through the transmission path between the antenna unit 8 and the third filter 203. Further, the fourth switcher 209 is switched so that the reception signal passes through the transmission path between the third filter 203 and the transmitting and receiving unit 27.

The filter A terminal 2031 of the third filter 203 is connected to the second switcher 204, and the filter B terminal 2032 of the third filter 203 is connected to the fourth switcher 209. Therefore, a reception signal transmitted from the first switcher 21 is transmitted to the fourth switcher 209.

Accordingly, the reception signal in Band 7 received by the antenna unit 8 passes through the first switcher 21, the third filter 203, the fourth switcher 209, and the transmitting and receiving unit 27.

Subsequently, a switch switching control will be explained in a case where a reception signal and a transmission signal in Band 41 upper side band is communicated.

The controller 28 performs switching control of the first switcher 21, the second switcher 204, and the fourth switcher 209 so that the reception signal and the transmission signal in Band 41 upper side band pass through the third filter 203 having the passband y1. More specifically, the first switcher 21 is switched so that the reception signal and the transmission signal pass through the transmission path between the antenna unit 8 and the third filter 203. The fourth switcher 209 is switched so that the reception signal and the transmission signal pass through the transmission path between the third filter and the second switcher 204. Further, the second switcher 204 is switched so that the reception signal and the transmission signal passes through the transmission path between the fourth switcher 209 and the third switcher 25.

As a result, the reception signal in Band 41 received by the antenna unit 8 passes through the first switcher 21, the third filter 203, the fourth switcher 209, the second switcher 204, the third switcher 25, and the transmitting and receiving unit 27.

The transmission signal in Band 41 passes through the transmitting and receiving unit 27, the electric power amplification unit 26, the third switcher 25, the second switcher 204, the fourth switcher 209, the third filter 203, and the first switcher 21, and is transmitted by the antenna unit 8 to a base station and the like.

As described above, in the communication device 2, the frequency band of Band 41 is covered by the passband x of the first filter 22 for Band 38 and the passbands y1 and y2 of the third filter 203 for Band 7, and therefore, the communication device 2 is not required to be further provided with a filter with a passband including the frequency band of Band 41. Therefore, the number of components constituting the communication device 2 can be reduced.

Figure 6:
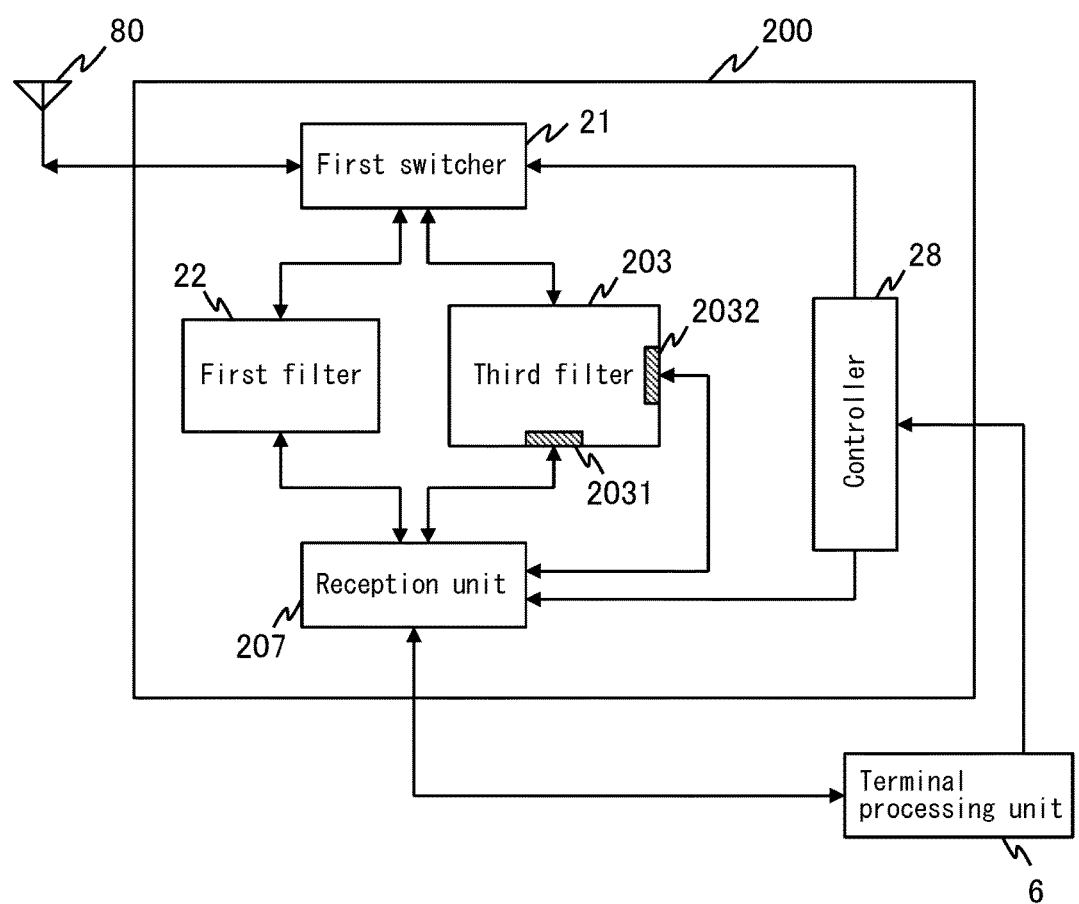
FIG. 6 is a figure illustrating an example of a schematic configuration of a communication device 200.

FIG. 6 is a figure illustrating an example of a schematic configuration of a communication device 200. In FIG. 6, the same constituent elements as those of the communication device 20 as illustrated in FIG. 5 will be denoted with the same reference numerals, and explanation thereabout is omitted.

The communication device 200 processes communication of signals in frequency bands corresponding to three bands, i.e., Band 41, Band 38, and Band 7. The communication device 200 is connected to an antenna unit 80. The antenna unit 80 transmits a signal received from a base station and the like to the communication device 200.

The communication device 200 includes a first switcher 21, a first filter 22, a third filter 203, a reception unit 207, a controller 28, and the like.

The reception unit 207 is constituted by a radio frequency IC (Integrated Circuit) and the like, and performs processing such as demodulation conversion of signals. The reception unit 207 gives a signal obtained by demodulating the reception signal to the terminal processing unit 6.

First, a switch switching control will be explained in a case where a reception signal in Band 38 and a reception signal in Band 41 middle band are received.

The controller 28 performs switch switching control in accordance with the frequency band that has been determined to be used. More specifically, the controller 28 performs switching control of the first switcher 21 so as to switch to one of the first filter 22 and the third filter 203 whichever is supporting the determined frequency band.

The controller 28 performs switching control of the first switcher 21 so that the reception signal in Band 38 and the reception signal in Band 41 middle band pass through the first filter 22 having the passband x. More specifically, the first switcher 21 is switched so that the reception signal and the transmission signal pass through the transmission path between the antenna unit 80 and the first filter 22.

As a result, the reception signal in Band 38 and the reception signal in Band 41 middle band received by the antenna unit 80 passes through the first switcher 21, the first filter 22, and the reception unit 207.

Subsequently, a switch switching control will be explained in a case where a reception signal in Band 41 lower side band is communicated.

The controller 28 performs switching control of the first switcher 21 so that the reception signal in Band 41 lower side band passes through the third filter 203 having the passband y2. More specifically, the first switcher 21 is switched so that the reception signal passes through the transmission path between the antenna unit 80 and the third filter 203.

As a result, the reception signal in Band 41 lower side band received by the antenna unit 80 passes through the first switcher 21, the third filter 203 (filter A terminal 2031), and the reception unit 207.

Subsequently, a switch switching control will be explained in a case where a reception signal in Band 7 is communicated.

The controller 28 performs switching control of the first switcher 21 so that the reception signal in Band 7 passes through the third filter 203 having the passband y1. More specifically, the first switcher 21 is switched so that the reception signal passes through the transmission path between the antenna unit 80 and the third filter 203.

As a result, the reception signal in Band 7 received by the antenna unit 80 passes through the first switcher 21, the third filter 203 (filter B terminal 2032), and the reception unit 207.

Subsequently, a switch switching control will be explained in a case where a reception signal in Band 41 upper side band is communicated.

The controller 28 performs switching control of the first switcher 21 so that the reception signal in Band 41 upper side band passes through the third filter 203 having the passband y1. More specifically, the first switcher 21 is switched so that the reception signal and the transmission signal pass through the transmission path between the antenna unit 80 and the third filter 203.

As a result, the reception signal in Band 41 upper side band received by the antenna unit 80 passes through the first switcher 21, the third filter 203 (filter B terminal 2032), and the reception unit 207.

The communication device 200 as well as the communication device 20 is equipped in the mobile phone 1, so that the terminal processing unit 6 can use one of the signals received using multiple antenna units 8 and 80 whichever the radio wave condition is good, or can combine signals received using multiple antenna units 8 and 80. Therefore, a communication can be performed by using a high quality reception signal.

It should be understood that a person skilled in the art could make various changes, replacements, and modifications to the present invention without deviating from the gist and the scope of the present invention.

REFERENCE SIGNS LIST 1 mobile phone
2, 20, 200 communication device
21 first switcher
22 first filter
23 second filter
203 third filter
2031 filter A terminal
2032 filter B terminal
24, 204 second switcher
25 third switcher
26 electric power amplification unit
27 transmitting and receiving unit
28 controller
209 fourth switcher
3 terminal storage unit
4 operation unit
5 display unit
6 terminal processing unit
7 attachment unit
8, 80 antenna unit

What is claimed is:

1. A communication device for communicating in a frequency band determined from a group consisting of a first frequency band of a first band; a second frequency band of a second band; and a third frequency band of a third band, the first frequency band between a first lower edge frequency and a first upper edge frequency, the second frequency band between a second lower edge frequency and a second upper edge frequency, the third frequency band between a third lower edge frequency and a third upper edge frequency, the communication device comprising:

a determining controller for determining a communication band to be used and a frequency of a signal to be used, from the first, second and third frequency bands, based on frequency band information included in a received signal from a base station, when the communication device is activated, or when the base station is changed to a different base station due to a handover of communication that occurred responsive to movement of the communication device;

a first filter for the second band for allowing a signal in a first passband between the first lower edge frequency and the second upper edge frequency to pass through;

a second filter for the third band for allowing a signal in a second passband between the third lower edge frequency and the first upper edge frequency to pass through;

a filter switcher for switching to any one of the first filter and the second filter; and a switching controller for controlling the filter switcher to switch to the first filter for the second band, when the communication band determined by the determining controller is the second frequency band of the second band, controlling the filter switcher to switch to the first filter for the second band, when the communication band determined by the determining controller is the first frequency band of the first band and a frequency of the signal to be used is included in the first passband, controlling the filter switcher to switch to the second filter for the third band, when the communication band determined by the determining controller is the third frequency band of the third band, controlling the filter switcher to switch to the second filter for the third band, when the communication band determined by the determining controller is the first frequency band of the first band and the frequency of the signal to be used is included in the second passband, wherein the first lower edge frequency and the second lower edge frequency is the same frequency, the first upper edge frequency and the third upper edge frequency is the same frequency, and the third lower edge frequency and the second upper edge frequency is the same frequency.

2. A communication device for communicating in a frequency band determined from a group consisting of a first frequency band of a first band; a second frequency band of a second band; and a fifth frequency band of a third band, the first frequency band between a first lower edge frequency and a first upper edge frequency used as an uplink frequency band and a downlink frequency band, the second frequency band between a second lower edge frequency and a second upper edge frequency used as an uplink frequency band and a downlink frequency band, the fifth frequency band including a third frequency band between a third lower edge frequency and a third upper edge frequency used as a downlink frequency band and a fourth frequency band between a fourth lower edge frequency and a fourth upper edge frequency used as an uplink frequency band, the communication device comprising:

a determining controller for determining a communication band to be used and a frequency of a signal to be used, from the first, second and third frequency bands, based on frequency band information included in a received signal from a base station, when the communication device is activated, or when the base station is changed to a different base station due to a handover of communication that occurred responsive to movement of the communication device;

a first filter for the second band for allowing a signal in a first passband between the second lower edge frequency and the second upper edge frequency to pass through;

a third filter for the third band including a filter for passing a signal in a second passband between the third lower edge frequency and the first upper edge frequency to pass through and a filter for passing a signal in a third passband between the first lower edge frequency and the fourth upper edge frequency to pass through;

a filter switcher for switching to any one of the first filter and the third filter; and a switching controller for controlling the filter switcher to switch to the first filter for the second band, when the communication band determined by the determining controller is the second frequency band of the second band, controlling the filter switcher to switch to the first filter for the second band, when the communication band determined by the determining controller is the first frequency band of the first band and a frequency of the signal to be used is included in the first passband, controlling the filter switcher to switch to the third filter for the third band, when the communication band determined by the determining controller is the third frequency band or the fourth frequency band included the fifth frequency band of the third band, controlling the filter switcher to switch to the third filter for the third band, when the communication band determined by the determining controller is the first frequency band for the first band and the frequency of the signal to be used is included in the second passband or the third passband, wherein the third lower edge frequency and the second upper edge frequency is the same frequency, the second lower edge frequency and the fourth upper edge frequency is the same frequency, and the first lower edge frequency and the fourth lower edge frequency is the same frequency, and the first upper edge frequency and the third upper edge frequency is the same frequency.

3. The communication device according to claim 2, wherein the first band is LTE Band 41 defined by 3GPP, the second band is LTE Band 38 defined by 3GPP, and the third band is LTE Band 7 defined by 3GPP.

* * * * *